United States Patent [19]

Bess

[11] Patent Number: 5,011,781

[45] Date of Patent: Apr. 30, 1991

[54] AUTORADIOGRAPHY ENHANCER AND METHOD OF USE

[75] Inventor: Coleman Bess, Chestnut Hill, Mass.

[73] Assignee: Electron Microscope Supplies Corporation, Chestnut Hill, Mass.

[21] Appl. No.: 387,506

[22] Filed: Jul. 31, 1989

Related U.S. Application Data

[62] Division of Ser. No. 124,827, Nov. 24, 1987, Pat. No. 4,871,480.

[51] Int. Cl.$^5$ .................... C09K 11/04; G01N 23/00; G03C 1/00; G21G 4/00

[52] U.S. Cl. ........................................ 436/57; 436/503; 436/504; 436/804; 252/600; 252/645; 252/646; 435/7.1; 435/188

[58] Field of Search .................. 436/57, 501, 503, 504, 436/547, 548, 804; 435/7, 188; 424/1.1; 252/600, 644, 645, 646; 534/10, 14

[56] References Cited

U.S. PATENT DOCUMENTS

| | | | |
|---|---|---|---|
| 3,068,178 | 12/1962 | Kallmann et al. | 436/57 |
| 4,293,436 | 10/1981 | Fost | 252/645 |
| 4,522,742 | 6/1985 | Lee et al. | 252/645 |
| 4,645,618 | 2/1987 | Lee et al. | 252/600 |
| 4,710,319 | 12/1987 | Lee et al. | 252/646 |

FOREIGN PATENT DOCUMENTS 2184352  8/1987  Japan ...................................... 436/57

OTHER PUBLICATIONS

"A Film Detection Method for Tritium Labelled Proteins & Nucleic Acids in Polyacrylamide Gels", Bonner and Laskey, Eur J Biochem 46, 83–88 (1974).

"Quantitative Film Detection of $^3$H and $^{14}$C in Polyacrylamide Gels by Fluorography," Laskey and Mills, Eur J Biochem. 56, 335–341 (1975).

"Efficient Fluorography of $^3$H and $^{14}$C on Thin Layers", Bonner and Stedman, Analytical Biochem 89, 247–256 (1978).

*Primary Examiner*—David L. Lacey
*Assistant Examiner*—Kimberly A. Trautman
*Attorney, Agent, or Firm*—Lahive & Cockfield

[57] ABSTRACT

Disclosed is an improved autoradiography enhancer composition and method of use. The enhancer composition uses an acid anhydride as a dehydration agent.

12 Claims, No Drawings

AUTORADIOGRAPHY ENHANCER AND METHOD OF USE

This is a division of U.S. application Ser. No. 07/124,827, filed Nov. 24, 1987, now U.S. Pat. No. 4,871,480 issued Oct. 13, 1989.

BACKGROUND OF THE INVENTION

The present invention relates to autoradiography compositions and methods. More particularly, the invention relates to methods and compositions useful in autofluorography, specifically compositions which enhance the detection of radiolabelled substances.

Autoradiography is the process by which an image is generated in a radiation sensitive material, e.g., a photographic emulsion, when exposed to radioactivity. This technique is particularly useful for identification of biological substances such as proteins, amino acids, or nucleic acids. Autoradiographic techniques involve radiolabelling the protein or nucleic acid with a radioactive isotope, and then determining the location of the radiolabelled molecule by allowing the radioactive emissions to expose a photoemulsion on the photographic plate or specimen coated with a photographic emulsion. Commonly used radioactive isotopes used for radiolabelling are $^3H$, $^{14}C$, $^{35}S$, $^{125}I$ and $^{32}P$. The radiolabelled material may be in a chromatograph, an electrophoresis gel, or a tissue specimen.

A major problem in autoradiography is that the low energy and/or radiation level emitted by many of these isotopes when incorporated into a protein or nucleic acid is insufficient to provide clear, rapid exposure of the photographic emulsion. Scintillators or fluors are used in order to achieve this end. Fluors are molecules that absorb the radiation emitted by the radioactive isotopes and emit light. The emitted light is more efficient at exposing the photographic emulsion than the emissions from the radioactive decay, leading to quicker and more accurate results.

In some circumstances, a scintillation solvent and/or a secondary fluor is incorporated into the solution in order to improve the efficiency of fluorescence. Scintillation solvents are chemicals which assist in the transfer of the emitted electron radiation from the radioactive isotopes to the fluors, improving the energy transfer and system efficiency. The secondary fluors absorb energy from the primary fluor and emit light at a different wavelength which may improve exposure of the photographic emulsion. The use of the fluor or scintillator system in this image-creating process is called autofluorography.

Autofluorography is useful with a wide variety of separation media and techniques. These include thin layer chromatography, paper chromatography, gel electrophoresis, and column chromatography. The radioactive material may be absorbed or adsorbed to the separation medium. Media which are useful include silica gel, alumina, cellulose, polyamide, polyacrylamide, cross-linked dextran, agarose, and nitrocellulose. These media are normally supported by a plate or other structure.

Despite its broad applicability, there are substantial problems with the use of autofluorography which make it a difficult method to apply. For example, in thin layer chromatography, where the radioactive emitters are at or near the surface of the chromatograph, they interact with the fluor in the surface layer. However, it is difficult to obtain a smooth, even distribution of the fluor even when using a spray technique for application. Uneven application can cause nonreproducible results. Additionally, since the fluor is normally dissolved in a carrier solvent, the radioactive material may migrate with the solvent, causing movement of bands which also can lead to inaccurate results. Further, small crystals of the scintillator which form during the processing may fall off or be moved during handling.

At the other extreme of media thickness, gel electrophoresis and other related media separation techniques use much thicker media, typically greater than 0.1 mm. These thicker media lead to different problems because the material to be detected is normally not located on the surface area but rather is disbursed throughout the media. Since the low energy radiation of the incorporated radioactive isotopes is greatly attenuated by distance, a surface treatment with the fluor is insufficient to visualize a majority of the emitted radiation, leading to inaccuracies. In order to counteract this, the fluor, either alone or in conjunction with an intermediate scintillation solvent and/or secondary fluor, is placed in intimate contact with the radioactive isotope to amplify the signal prior to attenuation. To achieve this contact, it is necessary to uniformly transfer the fluor system throughout the media which insures that there are no differences in results caused by incomplete adsorption of emitted radiation. Generally, this uniform transfer is accomplished by soaking the separation medium in a bath containing the fluor dissolved in a suitable solvent.

There are a number of different scintillation compositions and methods which have been used for enhanced autoradiography to identify materials incorporated into separation media. One system is described by Bonner at al., *Eur. J. Biochem.* 46(1):83-88 (1974). In this method, the radiolabelled protein is separated by electrophoresis using an aqueous polyacrylamide gel. Separation is followed by soaking the gel in about 20 times its volume of dimethylsufoxide (DMSO) for 30 minutes, and then immersed a second time for 30 minutes in fresh DMSO to displace all the water from the gel. The gel is then soaked in a 20% (w/w) solution of 2,5-diphenyloxazole (PPO) in DMSO to impregnate the gel with the scintilator PPO. The fluor is precipitated in the gel by immersing in water and the gel is dried and exposed to the photographic film.

The Bonner technique has a number of disadvantages, several of which are discussed in the appendix of the Laskey and Mills article in *Eur. J. Biochem.*, 56:335-341 (1975). For example, if agarose gels are used in place of acrylamide, the agarose will dissolve in DMSO. This is counteracted by the substitution of methanol for the DMSO but this substitution is only effective for gels having less than 2% polyacrylamide since gels having higher concentrations of polyacrylamide shrink severely when contacted with methanol. Another disadvantage is the ability of DMSO to penetrate through the skin of anyone handling it. DMSO can carry the dissolved material, some of which may be radioactive and otherwise potentially toxic, with it through the skin. DMSO also imparts a garlic smell to the breath. Other disadvantages reported include the length of time gels must be soaked in the DMSO-fluor solution to obtain complete impregnation, the requirement for high concentrations of PPO, and the time-consuming and waste-generating soakings in DMSO to dehydrate the gel.

Because of these problems, many other methods for incorporating fluors into separation media appear in the literature. Bonner and Stedman, *Anal. Biochem.*, 89:247-256 (1978), describe methods suitable for thin layer chromatography. These methods use scintillation solvents to increase the absorption ability of 2,5-diphenyloxazole. Although helpful for thin layer chromatography, these methods have serious drawbacks when applied to gel electrophoresis because the gels used generally contain greater than 80%, more often greater than 90%, water. The fluors and solvents used in the Bonner and Stedman methods are not water soluble or water miscible to any appreciable extent so they cannot be used for efficient and uniform transport of the fluors to the interior of the gel. In fact, the fluors tend to precipitate on the surface of the gel. In addition, the suggested organic solvents cause drastic shrinkage of the gel which prevents fluor impregnation and lead to distortion of the gel. In fact, aqueous polyacrylamide or agarose gels cannot be impregnated with 2,5-diphenyloxazole or 2-methylnaphthalene while in the hydrated state using these methods.

U.S. Pat. No. 4,293,436, issued on an application of Fost, describes a different autofluorographic technique which does not require a dehydration step. The aqueous separation medium is impregnated with a combination of a water-soluble or water-miscible lower alkyl carboxylic acid and an alcohol as a swelling inhibitor in which a scintillator fluor has been dissolved. The fluor is precipitated within the gel by aqueous soaking. However, this procedure also has several disadvantages. Proteins must first be fixed in a separate step. Further, there is limited or no reusability of the excess product used for impregnation, which increases costs and generates hazardous wastes. In addition, the combination of carboxylic acid and alcoholic swelling inhibitor is unstable and gradually forms a stable ester. This decreases the suitability of the product for its intended use and limits shelf life.

Another autofluorographic system is described in U.S. Pat. No. 4,522,742, issued on an application of Lee et al. In this technique, the separation medium is impregnated by an aqueous autofluorographic enhancer containing water soluble fluors. This water-based system does not, however, work effectively in very thin gels (<1.0 mm) or gels with less than 5% acrylamide or agarose. No dehydration step is needed since unlike the systems based on organic solvent impregnation and water precipitation, this aqueous system transports fluor into the gel without exchanging the solvent and without precipitating the fluor. However, the gels must be dried prior to film exposure. Water removed by vacuum aspiration contains the water soluble fluor intended for enhancement purposes, thereby requiring high initial fluor concentration. For thin, porous gels in which mechanical entrapment cannot be relied upon until sufficient evaporation has occurred to precipitate the water soluble fluor, enough fluor can be removed by vacuum aspiration to seriously decrease the enhancement process.

Thus, alternative methods for enhancing the detection of radiolabelled materials by means of autoradiography or autofluorography are being sought.

SUMMARY OF THE INVENTION

The present invention features compositions and methods useful in producing autofluorographs. The compositions of the present invention have the added advantage that they are reuseable, with 2-4 uses per solution being standard.

The autoradiography enhancer composition of the invention contains a dehydrating agent, an acid anhydride having the formula

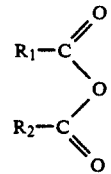

where $R_1$ and $R_2$ are selected from a group consisting of straight chain, branch chain, and substituted alkyl groups. One to three carbon atoms is the preferred chain length. The acid anhydride forms 5-95% by weight of the composition while 1-47.5% by weight is a water miscible acid, preferably a carboxylic acid. By "water miscible", what is meant is that the chemical is either easily mixed with or soluble with water. The preferred acid anhydrides are acetic anhydride, propionic anhydride, trichloroacetic anhydride, and mixtures thereof. The composition also includes a scintillation fluor which forms 0.01-25% by weight. Normally, a low percentage, 0.1-10% of the scintillation fluor is used. Preferred scintillation fluors are selected from a group consisting of 2, 5-diphenyloxazole; isopropyl phenyl biphenyloxadiazole; 2-[napthyl-(1')]-5-phenyloxazole; t-butylphenyl biphenylyl oxadiazole; p-quatraphenyl acetylene; diphenyl acetylene; 2, 5, diphenyl-3-methyloxazolium salts; 4-chloromethyl-2, 5-diphenyloxazole; polyethylene glycol di-1-naphthylmethyl ether; 4[5-(2-phenyloxazolyl)]benzene sulfonic acid; terphenyltrisulfonic acid trisodium salt; fluorene-2, 7-disulfonic acid disodium salt; 2, 5-diphenyl-3-methyloxazolium toluenesulfonate; 4-phthalimido methyl-2, 5-diphenyloxazole; 4-aminomethyl-2, 5-diphenyloxazole; and mixtures thereof.

For some uses, it is difficult to have the composition permeate throughout the separation media. To assist in this and in the later drying, a water miscible coupling agent selected from a group consisting of water miscible aliphatic ethers, aliphatic glycol ether esters, and mixtures thereof is used. Preferred coupling agents include diisopropylether, ethoxyethanol acetate, diethylene glycol monoethyl ether acetate, dipropylene glycol methyl ether acetate, and mixtures thereof. If a coupling agent is used, it normally comprises 1-25% by weight of the composition.

The composition of the present invention may also include a scintillation solvent to assist in capturing the radiation emitted from the radioisotope and transferring the energy to the scintillators. Preferred scintillation solvents are 2-methylnaphthalene, naphthalene, and terphenyl compounds. The composition may also include a secondary fluor. Preferred secondary fluors include p-bis[2-(4-methyl-5-phenyloxazoyl)] benzene; p-bis-(o-methylstyryl) benzene; p-p'-diphenyl stilbene; and 9, 10-diphenyl anthracene.

The invention additionally features a method of autofluorography. This method starts with the step of preparing a separation medium containing radiolabelled materials to be identified. Any standard separation medium, e.g., chromatographs, electrophoresis gels, or column chromatography gels can be used. The prepared separation medium is soaked in an excess, preferably a 3-5 fold excess, of an enhancer solution in order to enhance the signals from the incorporated radiolabelled isotopes. The composition of the invention is the preferred enhancer solution. The excess enhancer is then decanted and saved for future use. An aqueous solution may be added to precipitate the fluor, then the medium is dried. A photographic emulsion, preferably in the form of a photographic plate, is then exposed by contacting the enhanced separation medium with the plate. The reusability of the enhancer results in significant savings in the cost of the total autoradiography enhancer fluid and a decreasing amount of radioactive and hazardous waste produced.

The enhancer may also be used for enhancing autofluorographs on slides or other sections, e.g., tissue samples or electron micrographs.

The invention is more readily understood by the following detailed description.

DETAILED DESCRIPTION OF THE INVENTION

The present invention features an enhancer composition for autofluorography as well as a method of making autofluorographs. The invention provides improvements in time and cost efficiency as compared with standard autofluorographic processes and compositions.

The invention uses the chemical action of acid anhydrides to act as an in situ dehydrating agent. The combination of the acid anhydride and the acid yields benefits in development and clarity of the image.

The following non-limiting, illustrative examples will further explain the method and compositions of the invention.

EXAMPLE 1

In this Example, a composition of the invention was tested in four experiments, an initial test and three reuses against commercially available enhancers. The results show that even on reuse, the composition of the invention is as good or better than the commercially available compositions.

An electrophoretogram was prepared using a conventional Laemmli system technique (see Laemmli, Nature (Lond.) 227:680–685 (1970)), yielding a 1.5 mm thick 10% polyacrylamide slab gel 12.7 cm by 14 cm. The sample tested was derived from a human kaposi sarcoma cell culture labeled with $S^{35}$-methionine for one hour in methionine-free, serum-free media. The protein analyzed was Triton® X-100 solubilized protein (soluble proteins), 50,000 cpm analyzed per track (0.03 Ci), about 75% of total cell proteins.

Electrophoresis was carried out using 10–30 mA current in accordance with techniques well described in the prior art. After electrophoresis, the drained, water-washed gel was placed in about 4 volumes of a solution having the following compositions by weight: 37.74% acetic anhydride, 47.0% glacial acetic acid, 5.0% diethylene glycol monoethyl ether acetate, 10.0% 2-methylnaphthalene, 0.25% 2,5 diphenyloxazole and 0.01% butylated hydroxytoluene. The gel was gently agitated in a rocker for ½ hour after which the excess liquid was decanted and saved for reuse. About 5-10 volumes of water were added to the gel and gentle agitation resumed for an additional ½ hour to precipitate the fluor system. The gel was removed from the water and dried with heat and vacuum according to commonly used techniques. The dried gel was then put in contact with Kodak X-AR film for 18 hours at −70° C., and then the exposed film was developed, all according to standard techniques.

This entire procedure was repeated four times additional, the only variation being that the excess decanted liquid which had been saved for reuse, as described above, was serially substituted for the composition described in the example. Thus a series of five gels were sequentially treated using only the original volume of autoradiography enhancer fluid.

There were no noticeable signs of deterioration in the magnitude of amplification of the enhanced signal until the fifth reuse and even then, enhancement was still noticeable. Comparative testing was carried out using commercially available ENHANCE® and PPO-DMSO, utilizing the respective recommended procedures. The tests showed that the composition of the invention, on initial use and reuses one-three (four uses total) was equal to or better than ENHANCE® and PPO-DMSO on their respective initial uses. The only problem was that there was some oil or crystals noted in the system after the third use.

This Example clearly establishes that the present composition may be reused and still provide excellent enhancement.

EXAMPLE 2

In this Example, a similar composition within the scope of the invention was compared to a different commercial fluor system. The composition used was a solution having the following weight composition was evaluated: 47.0% glacial acetic acid, 37.72% acetic anhydride, 10.0% 2-methylnaphthalene, 5.0% diethylene glycol monoethyl ether acetate, 0.25% PPO, and 0.03% butylated hydroxytoluene.

The composition was tested using various samples of $^{35}S$ methionine labelled proteins and with $^{14}C$ standards in gels. The proteins were all immunoprecipitates.

The enhanced gels using the composition was compared with AUTOFLUOR, a commercially available enhancer, treated gels. The tests showed that the composition of the invention was superior to the commercially available product. Again, standard techniques as described in Example 1 were used.

The compositions and methods of the invention yield improvements in enhancement and the ability to handle a wide variety of gels without excess shrinkage. The compositions are reusable, cutting costs and allow simpler handling techniques than DMSO-based solutions.

Those skilled in the art will determine other embodiments of the invention.

Such other embodiments are included within the following claims.

What is claimed is:

1. A method of autofluorography comprising the steps of
   a. preparing a separation medium containing radiolabelled materials to be identified;
   b. enhancing said prepared separation medium by soaking said separation medium in an excess of an enhancer solution, said enhancer solution being reuseable and comprising
      1. about 5-95% by weight of an acid anhydride of the formula

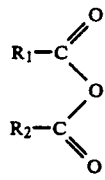

where $R_1$ and $R_2$ are selected from a group consisting of straight chain, branch chain, and substituted alkyl groups;

2. about 0.01-25% by weight of a water miscible acid; and
3. about 0.01-25% by weight of a scintillation fluor;

c. decanting said excess of said enhancer solution from said separation medium wherein said excess is available for reuse;
d. drying said separation medium; and
e. exposing a photographic emulsion to said enhanced separation medium, thereby forming an autofluorograph.

2. The method of claim 1 further comprising the step of soaking said separation medium in water to precipitate said fluor component from said scintillation fluor before said drying step.

3. The method of claim 1 wherein said acid comprises a carboxylic acid.

4. The method of claim 1 wherein said scintillation fluor is selected from the group consisting of 2, 5-diphenyloxazole; isopropyl phenyl biphenyloxadiazole; 2-[napthyl-(1')-5-phenyloxazole; t-butylphenyl biphenylyl oxadiazole; p-quatraphenyl acetylene; diphenyl acetylene, and mixtures thereof.

5. The method of claim 1 wherein said scintillation fluor is selected from the group consisting of 2, 5, diphenyl-3-methyloxazolium salts; 4-chloromethyl-2, 5-diphenyloxazole; polyethylene glycol di-1-naphthylmethyl ether; 4[5-(2-phenyloxazolyl)] benzene sulfonic acid; terphenyltrisulfonic acid trisodium salt; fluorene-2, 7-disulfonic acid disodium salt; 2, 5-diphenyl-3-methyloxazolium toluenesulfonate; 4-phthalimido methyl-2, 5-diphenyloxazole, 4-aminomethyl-2, 5-diphenyloxazole; and mixtures thereof.

6. The method of claim 1 wherein said enhancer composition further comprises a water miscible coupling agent, said coupling agent being selected from the group consisting of water miscible aliphatic ethers, aliphatic glycol ether esters, and mixtures thereof.

7. The method of claim 1 wherein said enhancer composition further comprises a secondary fluor.

8. The method of claim 7 wherein said secondary fluor is selected from the group consisting of p-bis[2-(4-methyl-5-phenyloxazoyl)] benzene; p-bis-(o-methylstyryl) benzene; p-p'-diphenyl stilbene; and 9, 10-diphenyl anthracene.

9. The method of claim 1 wherein said enhancer composition further comprises a scintillation solvent.

10. The method of claim 9 wherein said scintillation solvent is selected from the group consisting of 2-methylnaphthalene, naphthalene, and terphenyl compounds.

11. The method of claim 1 wherein said acid anhydride is selected from the group consisting of acetic anhydride, propionic anhydride, trichloroacetic anhydride, and mixtures thereof.

12. A method for preparing autoradiographs of tissue samples or electromicrographs comprising the steps of:
a. preparing a tissue sample or electromicrograph containing radiolabelled materials to be identified;
b. enhancing said prepared tissue sample or electromicrograph by soaking or coating said tissue samples or electromicrographs with an excess of enhancer solution, said enhancer solution being reusable and comprising
1. about 5-95% by weight of an acid anhydride of the formula

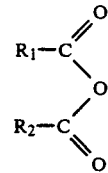

where $R_1$ and $R_2$ are selected from a group consisting of straight chain, branch chain, and substituted alkyl groups;
2. about 1-47.5% by weight of a water miscible acid; and
3. about 0.01-25% by weight of a scintillation fluor; and
c. exposing a photographic emulsion to said enhanced tissue samples or electromicrographs, thereby forming an autoradiograph.

* * * * *